US012657497B2

(12) United States Patent
Landsman et al.

(10) Patent No.:  US 12,657,497 B2
(45) Date of Patent:      Jun. 16, 2026

(54) MICROMOTION AND STRAY FIELD COMPENSATION OF A TRAPPED ION CHAIN

(71) Applicant: IonQ, Inc., College Park, MD (US)

(72) Inventors: Kevin Antony Landsman, Rockville, MD (US); Aleksey Blinov, Evanston, IL (US); Shantanu Debnath, Lanham, MD (US); Vandiver Chaplin, Brooklyn, NY (US); Kristin Marie Beck, Livermore, CA (US); Andrew Maps Ducore, College Park, MD (US); Melissa Jameson, Arlington, VA (US); Jason Hieu Van Nguyen, Hyattsville, MD (US); Felix Tripier, Washington, DC (US)

(73) Assignee: IonQ, Inc., College Park, MD (US)

( * ) Notice: Subject to any disclaimer, the term of this patent is extended or adjusted under 35 U.S.C. 154(b) by 978 days.

(21) Appl. No.: 17/880,399

(22) Filed: Aug. 3, 2022

(65) Prior Publication Data

US 2023/0039901 A1      Feb. 9, 2023

Related U.S. Application Data

(60) Provisional application No. 63/228,848, filed on Aug. 3, 2021.

(51) Int. Cl.
*G06N 10/40*          (2022.01)
*H01J 49/42*          (2006.01)

(52) U.S. Cl.
CPC ............ *G06N 10/40* (2022.01); *H01J 49/422* (2013.01)

(58) Field of Classification Search
None
See application file for complete search history.

(56)                    References Cited

U.S. PATENT DOCUMENTS

| 8,426,809 B2 * | 4/2013 | Kumph | ............... | H01J 49/4295 |
| | | | | 250/292 |
| 10,224,196 B2 * | 3/2019 | Giles | ..................... | H01J 49/062 |

(Continued)

OTHER PUBLICATIONS

D.J. Berkeland et al., "Minimization of ion micromotion in a Paul trap," J. Appl. Phys. 83, 5025-5033 (1998), 10 pages. (Year: 1998).*

(Continued)

*Primary Examiner* — Leigh M Garbowski
(74) *Attorney, Agent, or Firm* — ARENTFOX SCHIFF LLP

(57)                    ABSTRACT

Techniques to address the problem of having micromotion and stray fields affect trapped ions and the operation of QIP systems based on trapped ions are described. For example, one technique or approach may involve collecting scattered photons off the ions using a resonant or near-resonant oscillating electric field (e.g., a laser beam or a microwave source) with some projection in the axis or direction of micromotion that one wishes to reduce. Another technique or approach may include raising and lowering the trapping potentials to see how the ion position changes. The information collected from these techniques may be used to provide appropriate adjustments. Accordingly, the present disclosure describes methods, scripts, or techniques that minimize the effects of micromotion.

13 Claims, 7 Drawing Sheets

(56) References Cited

U.S. PATENT DOCUMENTS

| | | | | |
|---|---|---|---|---|
| 10,262,849 | B2 * | 4/2019 | Monroe | H01J 49/0027 |
| 10,510,523 | B2 * | 12/2019 | Kim | H01J 49/424 |
| 11,556,829 | B2 * | 1/2023 | Debnath | G02F 1/116 |
| 11,972,322 | B2 * | 4/2024 | Gaebler | H04B 10/70 |
| 2023/0230828 | A1 * | 7/2023 | Higgins | H01J 49/4245 |
| | | | | 250/292 |

OTHER PUBLICATIONS

T.F. Gloger et al.,' "Ion-trajectory analysis for micromotion minimization and the measurement of small forces," Physical Review A 92, 2015 American Physical Society, 12 pages. (Year: 2015).*
J. Keller et al., "Precise determination of micromotion for trapped-ion optical clocks," J. Appl. Phys. 118, 104501 (2015), 13 pages. (Year: 2015).*
A. Van Rynbach et al., "An integrated mirror and surface ion trap with a tunable trap location," J. Appl. Phys. 109, 221108 (2016), 6 pages. (Year: 2016).*
R. Saito et al., "Measurement of ion displacement via RF power variation for excess micromotion compensation," J. Appl. Phys. 129, 124302 (2021), 8 pages. (Year: 2021).*

* cited by examiner

MICROMOTION AND STRAY FIELD COMPENSATION OF A TRAPPED ION CHAIN

PRIORITY

This application claims priority to and the benefit from U.S. Provisional Application No. 63/228,848, filed on Aug. 3, 2021, and titled "Micromotion and Stray Field Compensation of Trapped Ion Chain in Transverse Direction," the contents of which are incorporated herein by reference in their entirety.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, operation and/or functionality of different QIP systems used as quantum computers or quantum simulators, and particularly for those QIP systems that handle operations based on atomic-based qubits. For QIP systems based on trapped atomic ions, such improvements include new techniques for the operation and handling of the trapped ions.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of techniques to improve the operation and handling of trapped ions in QIP systems, and more particularly in the implementation and use of techniques for the compensation of micromotion and stray fields in a trapped ion chain.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well-known components.

In QIP systems that use trapped ions for qubits, various signals are applied to an ion trap to provide the potentials that create the necessary confinement of the ionic species. It is this confinement that holds the ions in place for use as qubits for quantum calculations and quantum operations. These signals have multiple components, including an oscillating component, such as radiofrequency (RF) signals that produce RF fields, as well as a static component, such as direct current or DC signals that produce DC fields. The oscillating component creates an electric quadrupole that confines the ions in two-dimensions inside a harmonic RF pseudo-potential. Additionally, the typically weaker DC fields are engineered to create a harmonic potential that confines the ions in a third direction. It is this three-dimensional confinement and the repelling forces from the Coulomb interaction between the ions that creates a linear chain of ions in the direction of the DC confinement.

Solutions to the issues described above are explained in more detail in connection with FIGS. 1-6, with FIGS. 1-3 providing a background of QIP systems or quantum computers, and more specifically, of atomic-based QIP systems or quantum computers.

Figure 1:
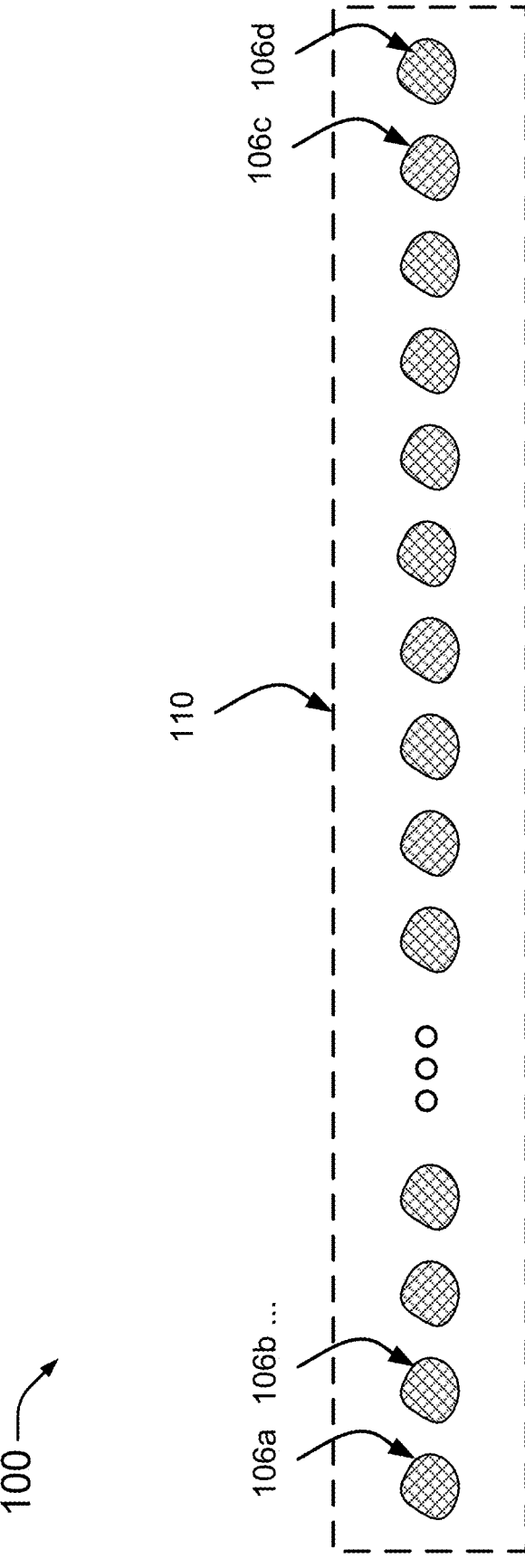
FIG. 1 illustrates a view of atomic ions a linear crystal or chain in accordance with exemplary aspects of this disclosure.
Figure 2:
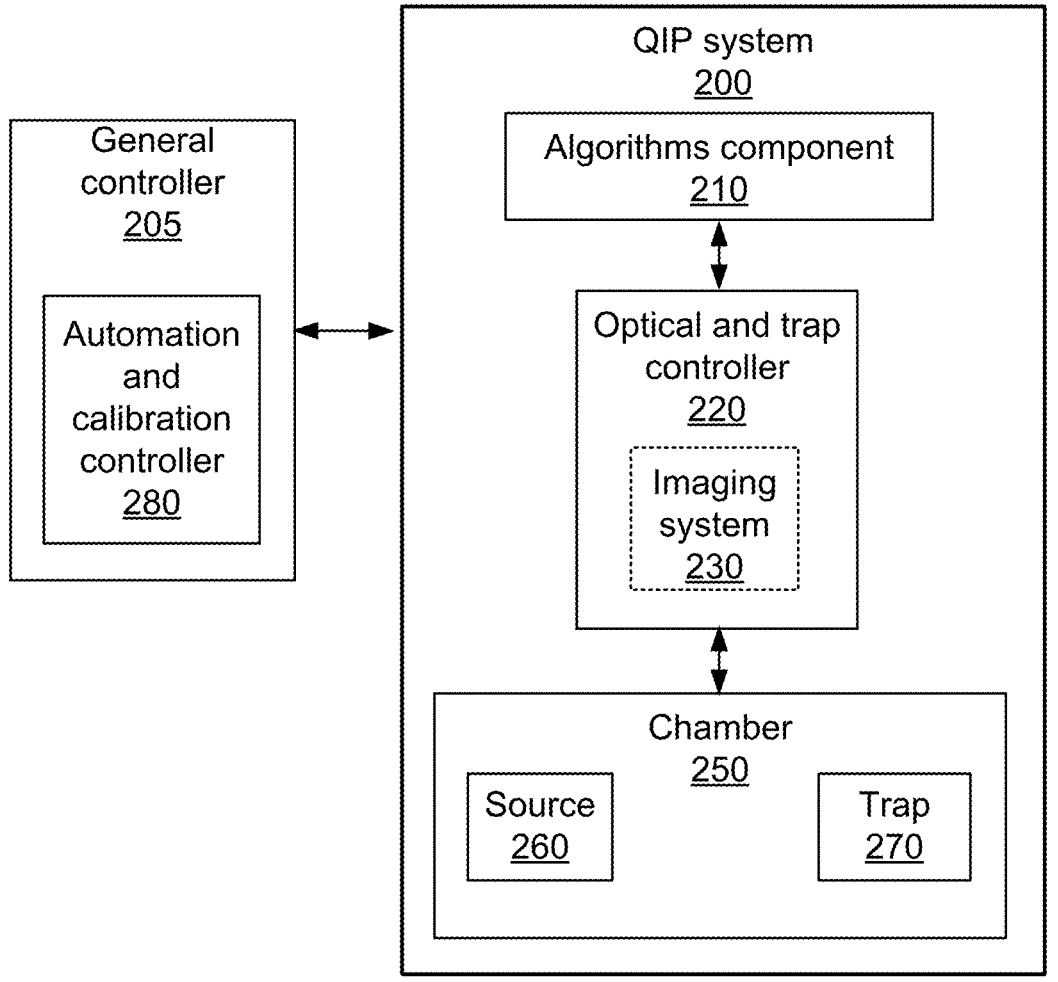
FIG. 2 illustrates an example of a quantum information processing (QIP) system in accordance with exemplary aspects of this disclosure.

FIG. 1 illustrates a diagram 100 with multiple atomic ions or ions 106 (e.g., ions 106a, 106b, . . . , 106c, and 106d) trapped in a linear crystal or chain 110 using a trap (not shown; the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization (e.g., ionic species) and confinement into the chain 110. Some or all of the ions 106 may be configured to operate as qubits in a QIP system.

In the example shown in FIG. 1, the trap includes electrodes (not shown) for trapping or confining multiple ions into the chain 110 laser-cooled to be nearly at rest. The number of ions trapped can be configurable and more or fewer ions may be trapped. The ions may be ytterbium ions (e.g., $^{171}Yb^+$ ions), for example. The ions are illuminated with laser (optical) radiation tuned to a resonance in $^{171}Yb^+$ and the fluorescence of the ions is imaged onto a camera or some other type of detection device (e.g., photomultiplier tube or PMT). In this example, ions may be separated by a few microns (μm) from each other, although the separation may vary based on architectural configuration. The separation of the ions is determined by a balance between the external confinement force and Coulomb repulsion and does not need to be uniform. Moreover, in addition to ytterbium ions, barium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

As mentioned above, different types of signals are applied to an ion trap to provide the potentials that create the necessary confinement of the ions 106 into the arrangement shown in the chain 110. That is, this confinement of the ions 106 into the chain 110 results from the oscillating component of the signals (e.g., the RF component) producing oscillating fields that confine the ions in two-dimensions inside a harmonic RF pseudo-potential and the static component of the signals (e.g., the DC component) producing DC fields that confine the ions in a third dimension inside DC potentials. The ions 106 are therefore confined in the direction of the DC confinement as a result of the potentials in the ion trap.

There is a point where the derivative of the harmonic RF pseudo-potential is zero, and this is referred to as an RF null. Similar to the RF confinement, there is a point where this DC confinement is flat. If the center of the DC confinement does not overlap with the center of the RF confinement, the position of the ions 106 will be perturbed by the oscillating RF field via a process known as micromotion. That is, if the radial forces from the DC fields are not zero at the RF null, the ions 106 will be displaced from the RF null and the ions 106 will be perturbed by the oscillating RF fields via micromotion. In ionic qubits (e.g., the ions 106), excess micromotion gives rise to a separate resonant transition known as a micromotion sideband. This separate resonant transition is undesired because it affects the performance of the system. When the micromotion is properly minimized, this transition has a vanishingly low probability of being excited. This is the case because the transition probability for the micromotion transition is suppressed when the ions 106 are at the RF null. Conversely, in the presence of micromotion, the maximum state transfer one can reach is related to the amount of excess micromotion. Micromotion may also cause the ions 106 to heat, which may worsen the fidelity of the quantum operations. Thus, excess micromotion may result in an undesired resonant transition and lower fidelity due to heating.

The present disclosure proposes techniques to address the problem of having micromotion and stray fields affect trapped ions and the operation of QIP systems based on trapped ions. For example, one technique or approach may involve collecting scattered photons off the ions 106 using a near-resonant oscillating electric field (e.g., a laser beam or a microwave source) with some projection in the axis or direction of micromotion that one wishes to reduce. Another technique or approach may include raising and lowering the trapping potentials to see how the ion position changes. The information collected from these techniques may be used to provide appropriate operational adjustments. Accordingly, the present disclosure describes methods, scripts, or techniques that minimize the effects of micromotion along certain directions.

FIG. 2 illustrates a block diagram that shows an example of a QIP system 200 in which the chain 110 of ions 106 shown in the diagram 100 in FIG. 1 is formed during operation of the QIP system 200 and where minimization of micromotion effects along certain directions may be desirable. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions (e.g., ytterbium ions and/or barium ions), the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) and/or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

The optical and trap controller 220 and/or the imaging system 230 may be further configured to implement and use of techniques described herein for the compensation of micromotion and stray fields in a chain of ions confined in the trap 270.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

As noted above, aspects of this disclosure may be implemented at least partially using the optical and trap controller 220, the imaging system 230, and/or the trap 270.

Figure 3:
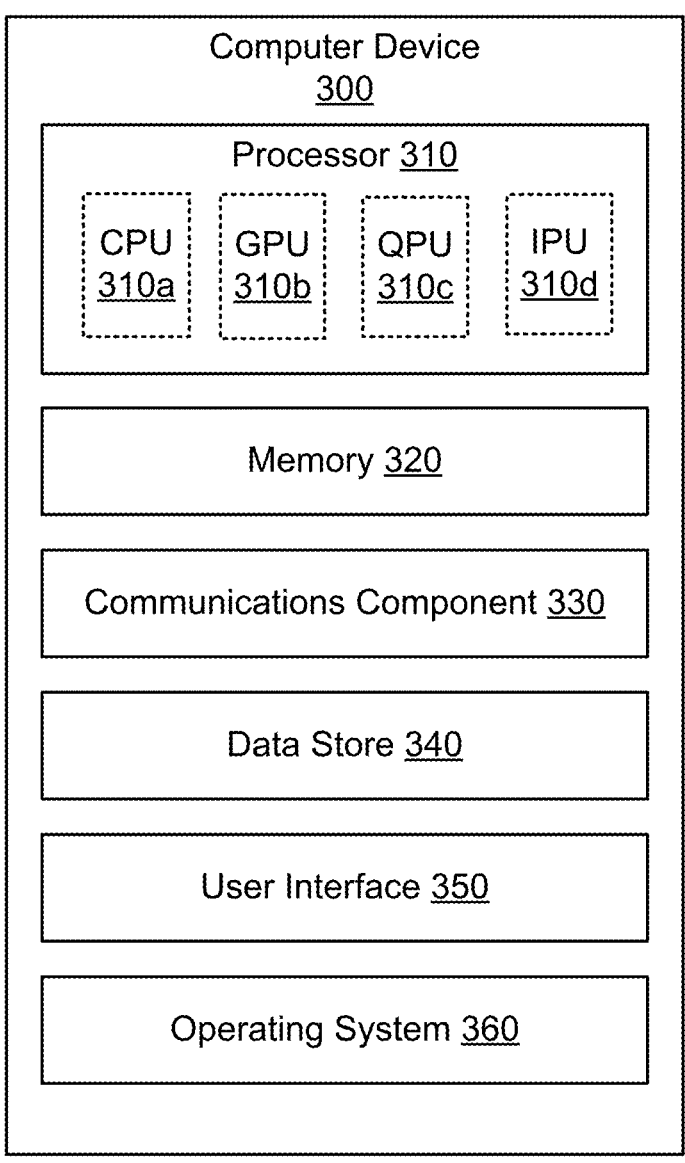
FIG. 3 illustrates an example of a computer device in accordance with exemplary aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310c. Some or all of the QPUs 310c may use atomic-based qubits, however, it is possible that different QPUs are based on different qubit technologies. QPUs 310c that are based on trapped ions for qubits may be configured to implement and use of the techniques described herein for the compensation of micromotion and stray fields in a chain of ions confined in an ion trap.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, the following description provides details regarding the proposed techniques for compensating for micromotion and stray fields in a chain of ions confined in an ion trap.

Figure 4:
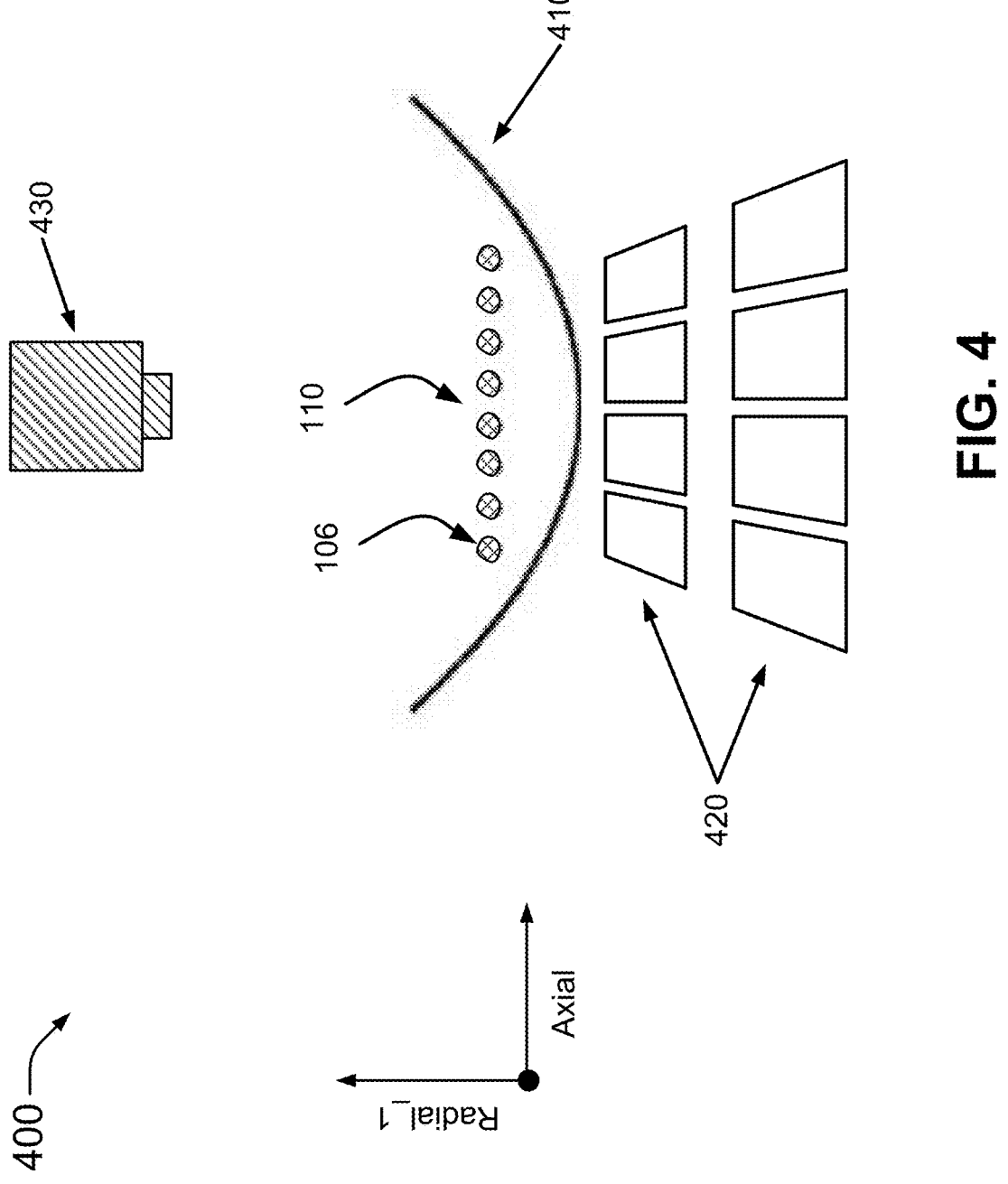
FIG. 4 illustrates an example of an apparatus and coordinate system for compensation of micromotion and stray fields of a trapped ion chain in accordance with exemplary aspects of this disclosure.

FIG. 4 shows a diagram 400 that illustrates an example of an apparatus and coordinate system to compensate for micromotion and stray fields in a QIP system. As mentioned above, the confinement of the ions 106 in the chain 110 in two-dimensions is inside a harmonic RF pseudo-potential and in a third dimension is inside DC potentials. Shown in the diagram 400 in FIG. 4 is a relevant coordinate system in connection with the confining potentials, including a first radial direction or coordinate (Radial_1) and an axial direction or coordinate. A second radial direction or coordinate (Radial_2) goes into the plane of FIG. 4 (not shown). The first and second radial directions are said to be transverse to the axial direction.

Also shown in the diagram 400 in FIG. 4 are a trapping RF pseudo-potential 410 in the axial direction, ion trap electrodes 420, and a camera 430 for imaging. In an example, the ion trap electrodes 420 may be part of a trap such as the trap 270 in the diagram 200 in FIG. 2, which may be an ion trap. In an example, the camera 430 may be part of the imaging system 230 in the diagram 200 in FIG. 2.

Although not shown in the diagram 400 in FIG. 4, there may be optical or laser beams applied to the ions 106 in the chain 110 for calibration, control, and/or operational reasons. These laser beams may have a projection onto the radial direction(s). The laser beams that are projected may be Raman laser beams (e.g., laser beams that excite a two-photon transition) or direct excitation laser beams on a sufficiently narrow transition within an ion 106.

In the direction that is orthogonal to both the ion trap axis (e.g., axial direction) and the direction of the Raman laser beams (e.g., direction in which the optical beams are applied to the ions 106), the following heuristic may be programmed into an execution to reduce micromotion in that direction:

First, and starting at a high value of the trapping RF pseudo-potential 410, the camera 430 is used to scan the imaging field (e.g., field of the imaging system) to find out where the ions 106 in the chain 110 are in focus with the camera 430. Second, with the camera 430 at the focus of the ions 106 in the chain 110, the trapping RF pseudo-potential 410 is lowered (e.g., by adjusting the corresponding RF signals), which defocuses the ions. Third, a compensation field is scanned to find out where the ions 106 in the chain 110 are in focus with the camera 430 when using the new, lowered trapping RF pseudo-potential 410. The compensation field is designed into the trap waveform (e.g., trap signals) as a separable field allowing for its magnitude to be changed or modified by simply changing the value of the respective field in the trap waveform.

The point in the scanning of the compensation field at which the ions 106 are back in focus corresponds to the minimization or nulling of micromotion in this direction at the lowered RF potential. Since this corrected field or potential may change where the ions are in focus on the camera, the approach described above may be repeated multiple times. For example, the correction may converge to a single value when the point in the scanning of the compensation field at which the ions 106 are back in focus converges to a single value (e.g., within a threshold).

Figure 5A:
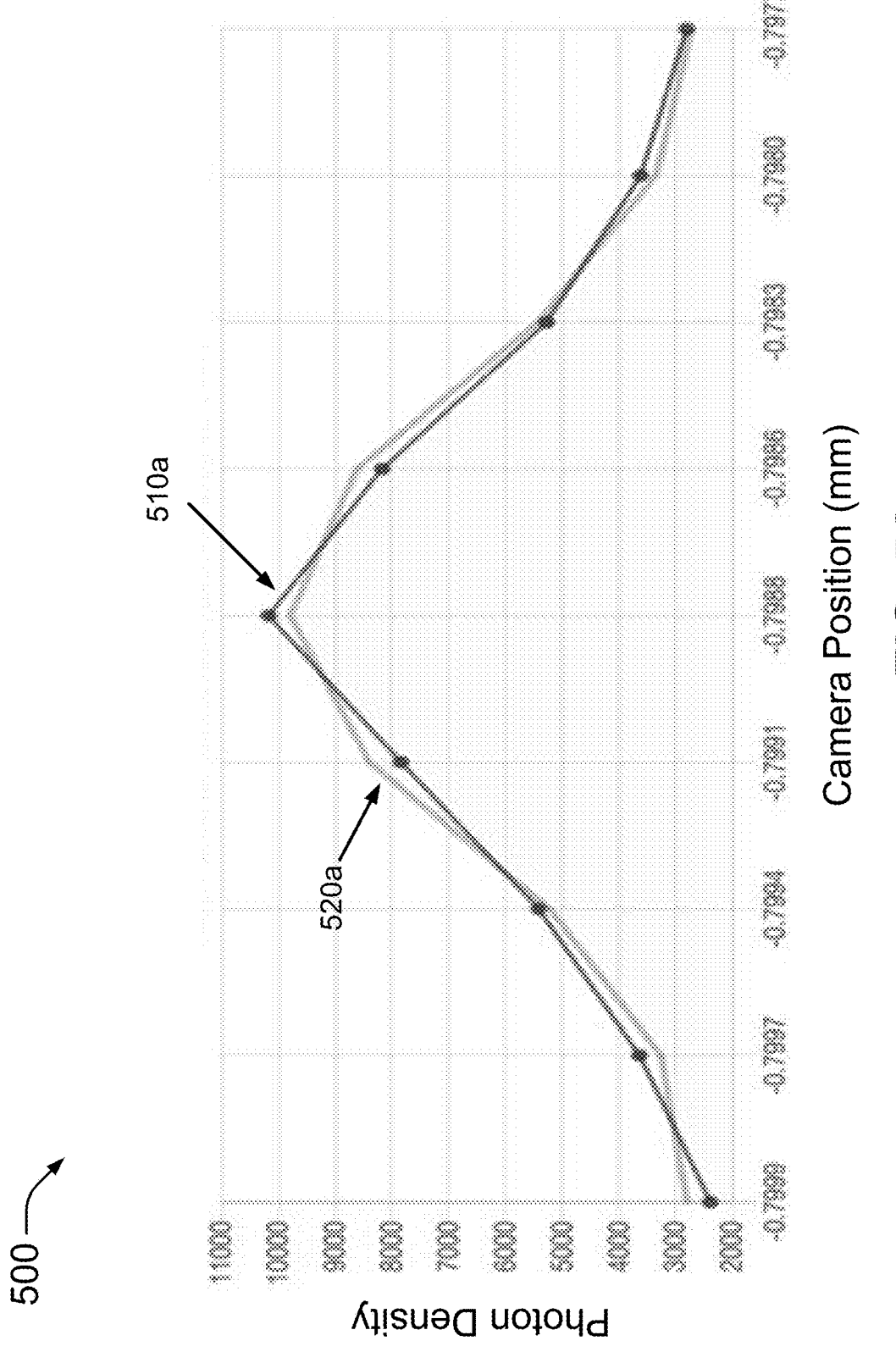
FIGS. 5A and 5B illustrate examples of measurement results from the camera-based compensation approach described herein in accordance with exemplary aspects of this disclosure.
Figure 5B:
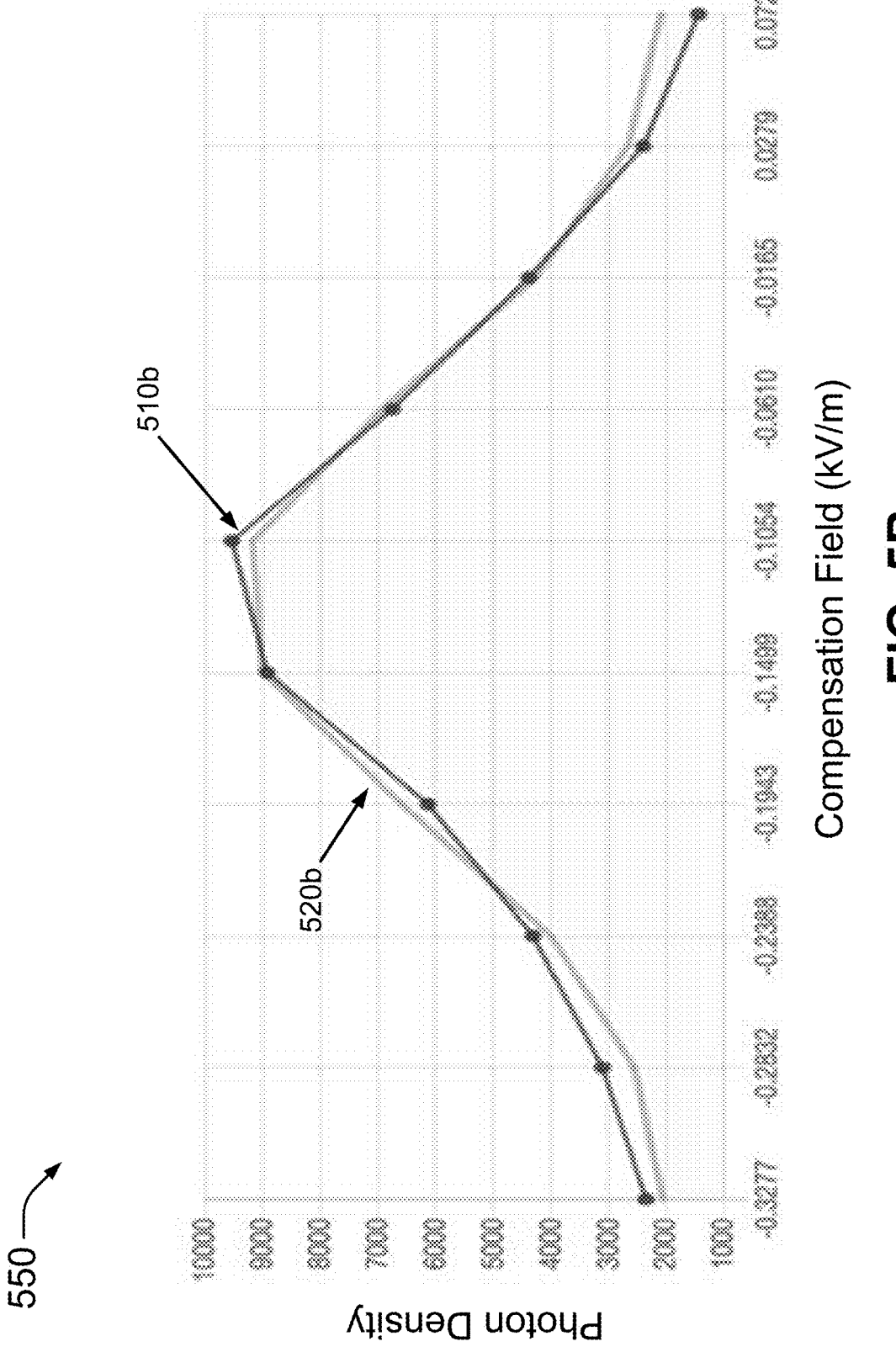

Examples of results from the camera-based measurements described above are shown in FIGS. 5A and 5B. In particular, FIG. 5A illustrates a diagram 500 that shows a (scattered) photon density measurement based on camera position (in millimeters or mm) and FIG. 5B illustrates a diagram 550 that shows a (scattered) photon density measurement based on compensation field (in kilovolts/meter or kV/m). The lines with dots 510a and 510b in the diagrams 500 and 550, respectively, show photon density measurements based on an objective function value. The lighter lines 520a and 520b in the diagrams 500 and 550, respectively, show fits of the results using a Gaussian curve. The photon density measurement may be obtained based on image data collected by the camera 430 and processed by, for example, the imaging system 230, based on the objective function value.

A camera-focusing algorithm or method used in connection with the technique described above allows for any suitable objective function to be used for which the input is the pixel data of an image of the ions 106 in the chain 110. That is, the objective function may be used in a camera-focusing algorithm to identify the proper focus in the heuristics described above by, for example, determining a peak or highest value in the objective function. In the examples in FIGS. 5A and 5B, the measurements in photon density corresponds to values of the objective function.

The choice of objective function is driven by a number of factors, such as the camera spatial resolution, the dynamic range of the camera, the imaging system characteristics, for example. In one implementation, the following objective function may be used: First, a blob detection algorithm may be used to identify the individual ion projections onto the camera 430. This detection algorithm will provide the positions, the areas $(S_i)$ and the average blob light intensity $(I_i)$ for each ion 106 in the chain 110. The algorithm parameters are tuned to cover the required range of blob sizes and their light intensities. Second, the objective function value is then calculated as $F=sum(W_i \times I_i/S_i)$, where Wi is a weight assigned to each spot (e.g., to captured pixel data associated with each ion 106), and i is the identifier of a particular ion 106 in the chain 110. This detection technique may be implemented using the optical and trap controller 220 and/or the imaging system 230 described above. The measurements in photon density plotted in the lines 510a and 510b may correspond to the values of the objective function determined by using the blob detection and objective function calculations described above.

Referring back to the diagram 500 in FIG. 5A, the ions 106 in the chain 110 are in focus with the camera 430 at the peak or highest value of the line 510a. The measurements in photon density illustrated by the line 510a are a result of determining the values of the objective function. The camera position found in this way identifies the focus position of the ions 106 in the chain 110. Based on the heuristic described above, the trapping RF pseudo-potential 410 is lowered after this camera position is identified. Next, and referring back to the diagram 550 in FIG. 5B, a compensation field is scanned to find a peak or highest value of the line 510b where the ions 106 in the chain 110 are again in focus with the camera 430 when using the new, lowered trapping RF pseudo-potential 410. Again, the measurements in photon density illustrated by the line 510b are a result of the determining the values of the objective function. The point in the scanning of the compensation field at which the ions 106 are back in focus corresponds to the minimization or nulling of micromotion in this direction at the lowered RF potential. As noted above, since this corrected field or potential may change where the ions are in focus on the camera, the approach described above may be repeated multiple times.

To minimize micromotion in the direction parallel to the direction of the Raman laser beams, another approach or technique may be used. Here, the micromotion sideband is driven by using the Raman laser beams resonantly and the compensation field is scanned in this direction. Again, the compensation field is built into the trap waveform as a separable field and may be programmed or changed dynamically. As micromotion is nulled, the transition becomes weaker, and the resonant excitation strength goes down. As micromotion is added, the transition becomes stronger, and more excitation is detected.

Figure 6:
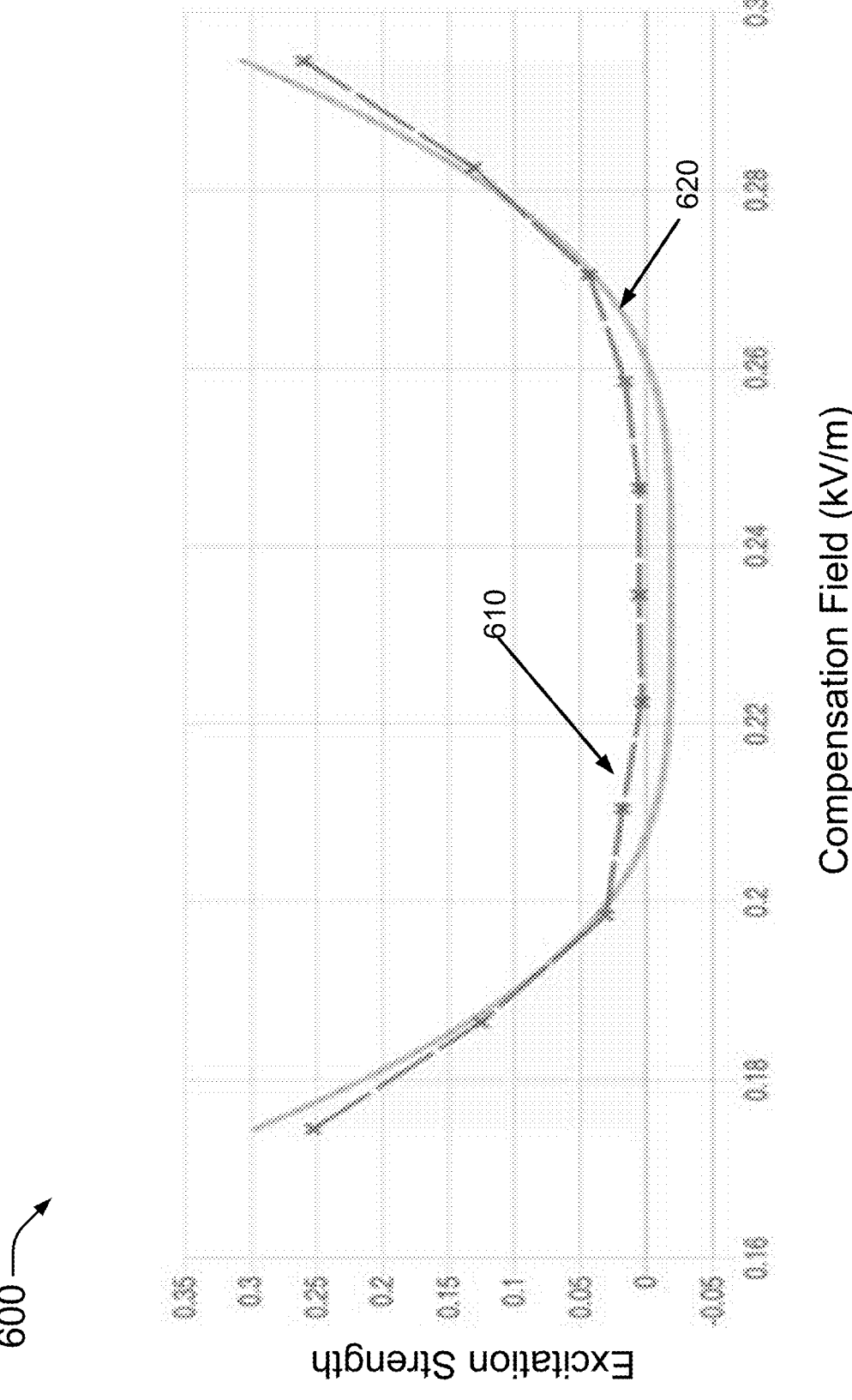
FIG. 6 illustrates examples of measurement results from the Raman-beam based approach described herein in accordance with exemplary aspects of this disclosure.

An example of those types of measurements is shown in a diagram 600 in FIG. 6. That is, the diagram 600 in FIG. 6 shows measurement results from the Raman beam-based approach with line with crosses and dashed lines 610 corresponding to the averaged bright-state population of the entire ion chain 110 resulting from resonant excitation measurements using a PMT, and the light line 620 corresponding to a Bessel function fitted to the data. In an example, the Bessel function is a second order Bessel function of the first kind. Therefore, the point in the middle of line 610, which represents the lowest averaged bright-state population, is the point at which micromotion is minimized in this direction.

In connection with the descriptions of FIGS. 1-6, a method for nulling micromotion in ions in an ion trap is described that includes performing a heuristic operation. This heuristic operation includes determining a point at which the ions are in focus, lowering, at the point at which the ions are in focus, a confining RF pseudo-potential, and determining, at the lowered confining RF pseudo-potential and by scanning a compensation field, a new point at which the ions are in focus that corresponds to a substantial nulling of the micromotion. The method further includes controlling operation of the ion trap based on the substantially nulled micromotion to perform quantum calculations.

In an aspect of this method, the nulling of the micromotion is in a direction orthogonal to both an axis of the ion trap and a direction of Raman laser beams applied to the ions.

In an aspect of this method, determining the point at which the ions are in focus and determining the new point at which the ions are in focus each includes determining the highest value in measurements in photon density of the ions based on image data of the ions captured by a camera. Determining the highest value in measurements in photon density based on image data of the ions captured by the camera includes determining values of an objective function for different distances from the camera that correspond to the measurements in photon density and identifying a highest of the values of the objective function as the highest value in measurements in photon density. The image data of the ions may include size and intensity information of image blobs of the ions as captured by the camera. Moreover, the objective function may apply weights to the size and intensity information of the image blob of each ion independently.

In an aspect of this method, the scanning of the compensation field includes modifying an ion trap waveform and applying the modified ion trap waveform to the ion trap.

In an aspect of this method, the method further includes repeating at least a portion of the heuristic operation. The repeating of at least a portion of the heuristic operation may be performed until convergence to a value, for example.

In connection with the descriptions of FIGS. 1-6, a QIP system configured to null micromotion in ions in an ion trap is described that includes the ion trap configured to hold the ions in a chain, an imaging system having a camera and one or more laser sources, and an optical and trap controller. The optical and trap controller is configured to determine a point at which the ions are in focus, lower, at the point at which the ions are in focus, a confining RF pseudo-potential, and determine, at the lowered confining RF pseudo-potential and by scanning a compensation field, a new point at which the ions are in focus that corresponds to a substantial nulling of the micromotion. The optical and trap controller is further configured to control operation of the ion trap based on the substantially nulled micromotion to perform quantum calculations.

In an aspect of this QIP system, the nulling of the micromotion is in a direction orthogonal to both an axis of the ion trap and a direction of Raman laser beams applied to the ions.

In an aspect of this QIP system, the optical and trap controller is further configured to determine the point at which the ions are in focus and determine the new point at which the ions are in focus by in each case determining the highest value in measurements in photon density of the ions based on image data of the ions captured by the camera. The optical and trap controller is further configured to determine the highest value in measurements in photon density based on image data of the ions captured by the camera by determining values of an objective function for different distances from the camera that correspond to the measurements in photon density and by identifying a highest of the values of the objective function as the highest value in measurements in photon density. The image data of the ions may include size and intensity information of image blobs of the ions as captured by the camera. Moreover, the objective function may apply weights to the size and intensity information of the image blob of each ion independently.

In an aspect of this QIP system, the scanning of the compensation field includes modifying an ion trap waveform and applying the modified ion trap waveform to the ion trap.

In an aspect of this QIP system, the optical and trap controller is further configured to repeat at least a portion of the heuristic operation. The repeating of at least a portion of the heuristic operation may be performed until convergence to a value, for example.

In connection with the descriptions of FIGS. 1-6, a method for nulling micromotion in ions in an ion trap is described that includes scanning a compensation field by varying a field in a trap waveform applied to the ion trap, determining where an excitation strength of the scanned compensation field is weakest to identify a condition where micromotion is substantially nullified, and controlling operation of the ion trap at the condition where the micromotion is substantially nulled.

In an aspect of this method, the nulling of the micromotion is in the direction parallel to the Raman laser beams.

In an aspect of this method, the scanning the compensation field includes measuring the excitation strength from the ions in the ion trap using a photomultiplier.

In connection with the descriptions of FIGS. 1-6, a QIP system configured to null micromotion ions in an ion trap is described that includes the ion trap configured to hold the ions in a chain, an imaging system having a photomultiplier and one or more laser sources, and an optical and trap controller. The optical and trap controller is configured to perform an operation that includes scanning, using the photomultiplier, a compensation field by varying a field in a trap waveform applied to the ion trap, determining where an excitation strength of the scanned compensation field is weakest to identify a condition where micromotion is substantially nullified, and controlling operation of the ion trap at the condition where the micromotion is substantially nulled.

In an aspect of this QIP system, the nulling of the micromotion is in the direction parallel to the Raman laser beams.

The techniques or approaches described herein to compensate for micromotion in different directions may be performed independent form each other, however, they may be combined and performed sequentially or concurrently to provide micromotion compensation in both directions.

Since the intensity of the laser beam that shines onto the ions 106 drifts around, it is necessary to find a way to keep the micromotion signal constant. Part of the normal operation of a quantum computer is to calibrate single qubit rotational gates. This calibration may be used to determine the correct laser pulse duration and intensity to keep the measurement constant in the presence of drifting laser beams. It is possible to apply an experimentally determined multiplicative factor to enhance the micromotion signal.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for nulling micromotion in ions in an ion trap, comprising:
   performing a heuristic operation that includes:
      determining a point at which the ions are in focus,
      lowering, at the point at which the ions are in focus, a confining radio frequency (RF) pseudo-potential, and
      determining, at the lowered confining RF pseudo-potential and by scanning a compensation field, a new point at which the ions are in focus that corresponds to a substantial nulling of the micromotion; and
   controlling operation of the ion trap based on the substantially nulled micromotion to perform quantum calculations,
   wherein determining the point at which the ions are in focus and determining the new point at which the ions are in focus each includes determining a highest value in measurements in a photon density of the ions based on image data of the ions captured by a camera.

2. The method of claim 1, wherein the nulling of the micromotion is in a direction orthogonal to both an axis of the ion trap and a direction of Raman laser beams applied to the ions.

3. The method of claim 1, wherein determining the highest value in measurements in the photon density based on the image data of the ions captured by the camera includes determining values of an objective function for different distances from the camera that correspond to the measurements in photon density and identifying a highest of the values of the objective function as the highest value in measurements in photon density.

4. The method of claim 3, wherein the image data of the ions includes size and intensity information of image blobs of the ions as captured by the camera.

5. The method of claim 4, wherein the objective function applies weights to the size and intensity information of the image blob of each ion independently.

6. The method of claim 1, wherein the scanning of the compensation field includes modifying an ion trap waveform and applying the modified ion trap waveform to the ion trap.

7. The method of claim 1, further comprising repeating at least a portion of the heuristic operation.

8. A quantum information processing (QIP) system configured to null micromotion in ions in an ion trap, comprising:
   the ion trap configured to hold the ions in a chain;

an imaging system having a camera and one or more laser sources; and an optical and trap controller configured to:

determine a point at which the ions are in focus, lower, at the point at which the ions are in focus, a confining radio frequency (RF) pseudo-potential, and determine, at the lowered confining RF pseudo-potential and by scanning a compensation field, a new point at which the ions are in focus that corresponds to a substantial nulling of the micromotion; and control operation of the ion trap based on the substantially nulled micromotion to perform quantum calculations, wherein the optical and trap controller is further configured to determine the point at which the ions are in focus and determine the new point at which the ions are in focus by, in each case, determining a highest value in measurements in a photon density of the ions based on image data of the ions captured by the camera.

9. The QIP system of claim 8, wherein the nulling of the micromotion is in a direction orthogonal to both an axis of the ion trap and a direction of Raman laser beams applied to the ions.

10. The QIP system of claim 8, wherein the optical and trap controller is further configured to determine the highest value in measurements in the photon density based on the image data of the ions captured by the camera by determining values of an objective function for different distances from the camera that correspond to the measurements in photon density and by identifying a highest of the values of the objective function as the highest value in measurements in photon density.

11. The QIP system of claim 10, wherein the image data of the ions includes size and intensity information of image blobs of the ions as captured by the camera.

12. The QIP system of claim 11, wherein the objective function applies weights to the size and intensity information of the image blob of each ion independently.

13. The QIP system of claim 8, wherein the scanning of the compensation field includes modifying an ion trap waveform and applying the modified ion trap waveform to the ion trap.

* * * * *